(12) United States Patent
Alexander et al.

(10) Patent No.: US 12,399,717 B2
(45) Date of Patent: Aug. 26, 2025

(54) PROCESSING DEVICE FOR INTERMEDIATE VALUE SCALING

(71) Applicant: Graphcore Limited, Bristol (GB)

(72) Inventors: Alan Alexander, Wotton-under-Edge (GB); Simon Knowles, Corston (GB); Stephen Felix, Bristol (GB); Carlo Luschi, Oxford (GB); Badreddine Noune, Bristol (GB); Mrudula Gore, Bath (GB); Godfrey Da Costa, Bristol (GB); Edward Andrews, Bristol (GB); Dominic Masters, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 18/175,050

(22) Filed: Feb. 27, 2023

(65) Prior Publication Data

US 2023/0281015 A1    Sep. 7, 2023

(30) Foreign Application Priority Data

Mar. 2, 2022  (GB) ...................................... 2202905

(51) Int. Cl.
*G06F 9/30* (2018.01)

(52) U.S. Cl.
CPC ........ *G06F 9/30101* (2013.01); *G06F 9/3001* (2013.01); *G06F 9/30014* (2013.01); *G06F 9/30025* (2013.01)

(58) Field of Classification Search
CPC ...... G06F 9/30025; G06F 5/012; G06F 7/483; G06F 9/30101; G06F 9/30014; G06F 9/3001
See application file for complete search history.

(56) References Cited

U.S. PATENT DOCUMENTS

| | | | | | |
|---|---|---|---|---|---|
| 5,892,697 | A | * | 4/1999 | Brakefield | .............. G06F 7/483 |
| | | | | | 708/550 |
| 5,912,710 | A | * | 6/1999 | Fujimoto | .............. H04N 9/8227 |
| | | | | | 386/E9.04 |

(Continued)

OTHER PUBLICATIONS

Search Report dated Nov. 1, 2022 for United Kingdom Patent Application No. GB2202905.2 3 pages.

*Primary Examiner* — Keith E Vicary
(74) *Attorney, Agent, or Firm* — HAYNES AND BOONE, LLP

(57) ABSTRACT

A processing device comprising: a control register configured to store a scaling factor; at least one execution unit configured to execute instructions to perform arithmetic operations on input floating-point numbers provided according to a first floating-point format, wherein each of the input floating-point numbers provided according to the first floating-point format comprises a predetermined number of bits, wherein the at least one execution unit is configured to, in response to execution of an instance of a first of the instructions: perform processing of a first set of the input floating-point numbers to generate a result value, the result value provided in a further format and comprising more the predetermined number of bits, enabling representation of a greater range of values than is representable in the first floating-point format; and apply the scaling factor specified in the control register to increase or decrease an exponent of the result value.

13 Claims, 10 Drawing Sheets

In response to execution of an instance of a first of the instructions: performing processing of a first set of the input floating-point numbers to generate a result value.  ⟶ S920A In response to execution of an instance of a first of the instructions: applying the scaling factor specified in the control register to increase or decrease an exponent of the result value  ⟶ S920B

(56) References Cited

U.S. PATENT DOCUMENTS

| | | | |
|---|---|---|---|
| 11,216,275 B1* | 1/2022 | James-Roxby | G06F 5/012 |
| 2002/0184282 A1* | 12/2002 | Yuval | G06F 7/483 |
| | | | 708/204 |
| 2004/0128486 A1* | 7/2004 | Sperber | G06F 9/30014 |
| | | | 712/221 |
| 2006/0112160 A1* | 5/2006 | Ishii | G06F 9/30025 |
| | | | 712/E9.021 |
| 2007/0258641 A1* | 11/2007 | Srinivasan | H04N 1/407 |
| | | | 382/166 |
| 2009/0172349 A1* | 7/2009 | Sprangle | G06F 9/30025 |
| | | | 712/E9.021 |
| 2010/0073386 A1* | 3/2010 | Zhang | G06T 1/20 |
| | | | 345/550 |
| 2016/0085507 A1* | 3/2016 | Kim | G06F 7/483 |
| | | | 708/209 |
| 2016/0306608 A1* | 10/2016 | Nystad | G06F 7/485 |
| 2018/0121199 A1* | 5/2018 | Uliel | G06F 7/483 |
| 2018/0262205 A1* | 9/2018 | Li | G06F 9/30025 |
| 2018/0322382 A1* | 11/2018 | Mellempudi | G06N 3/084 |
| 2018/0336165 A1* | 11/2018 | Phelps | G06F 17/16 |
| 2019/0042193 A1* | 2/2019 | Pasca | G06F 7/4876 |
| 2019/0042244 A1 | 2/2019 | Henry | |
| 2019/0163474 A1* | 5/2019 | Valentine | G06F 9/30014 |
| 2020/0201602 A1* | 6/2020 | Felix | G06F 5/012 |
| 2021/0064976 A1* | 3/2021 | Sun | G06N 3/063 |
| 2022/0334798 A1* | 10/2022 | Lin | G06F 7/4876 |

* cited by examiner

PROCESSING DEVICE FOR INTERMEDIATE VALUE SCALING

CROSS-REFERENCE TO RELATED APPLICATIONS

The present application claims priority to United Kingdom Patent Application No. GB2202905.2 filed Mar. 2, 2022, the disclosure of which is hereby incorporated herein by reference in its entirety.

TECHNICAL FIELD

The present disclosure relates to a processing device and in particular to a processing device for performing arithmetic operations on floating-point numbers.

BACKGROUND

In computing, bit sequences of predefined sizes are used to represent numbers. The particular representation of a bit sequence determines how that bit sequence is interpreted.

One form of representation is the floating-point representation, which is often used to approximately represent real numbers. Certain floating-point formats are laid out in the IEEE Standard 754. The floating-point representation comprises 3 separate components, i.e. a sign component, a mantissa component, and an exponent component. In the so-called single-precision (i.e. 32-bit) floating point representation (according to IEEE Standard 754), the sign component consists of a single bit, the exponent consists of 8 bits, and the mantissa consists of 23 bits. In the so-called half-precision (i.e. 16-bit) floating-point representation (according to IEEE standard 754), the sign component consists of a single bit, the mantissa consists of 10 bits, and the exponent consists of 5 bits. In most cases, a number is given from these 3 components by the following formula:

$$(-1)^{signbit} \times I.mantissa \times 2^{exponentbits-bias}$$

The displayed "bias" to the exponent is dependent upon the range of values required. IEEE 754 has chosen values as follows. In the single-precision representation, the default bias is equal to 127. In the half-precision format, the default bias is equal to 15. The exponent bits of a floating-point value may be adjusted by performing scaling of that number using a scaling factor in order to effect a bias change required for a particular arithmetic operation.

Here "I" is an implicit bit, which is derived from the exponent. In the case that the exponent bit sequence consists of anything other than all zeros or all ones, the implicit bit is equal to one and the number is known as a normal (abbreviated to "Norm" herein). In this case, the floating-point number is given by:

$$(-1)^{signbit} \times 1.mantissa \times 2^{exponentbits-bias}$$

In the case that the exponent bit sequence consists of all zeros, the implicit bit is equal to zero and the number is known as denormalised or subnormal, (abbreviated to "denorm" herein). In this case, the floating-point number is given by:

$$(-1)^{signbit} \times 0.mantissa \times 2^{exponentbits-bias}$$

The denorms are useful, since they allow smaller numbers to be represented than would otherwise be representable by the limited number of exponent bits.

The other circumstance—in which the exponent bit sequence consists of all ones—may be used to represent special cases, e.g. ±infinity or NaN (Not a Number). NaN is a numeric data type value representing an undefined or unrepresentable value. The presence of a NaN in the results of a calculation is often taken to signal an exception. In any event, subsequent steps in a calculation cannot be carried out.

Table 1 summarises how the floating-point numbers are interpreted for different ranges of the exponent and the mantissa according to the IEEE 754 standard.

TABLE 1

| Exponent | Mantissa Zero | Mantissa non-zero |
| --- | --- | --- |
| $00_H$ | zero, −0 | denormal numbers |
| $01_H, \ldots, FE_H$ | | normalized value |
| $FF_H$ | ±infinity | NaN (quiet, signalling) |

As shown in table 1, if the exponent consists of all zeros, and the mantissa consists of all zeros, the floating-point number is taken to be equal to zero (either +0, −0). If the exponent consists of all zeros and the mantissa is non-zero, the floating-point number is a denorm. If the exponent consists of all ones and the mantissa consists of all zeros, the floating-point number is taken to represent ±infinity. If the exponent consists of all ones and the mantissa is non-zero, the floating-point number is taken to be equal to NaN. In the case that the exponent is anything other than all zeros and all ones, the floating-point number is a norm. The IEEE standard lays out a number of different NaN codes; represented by different mantissa values.

Beyond the IEEE standard, there is a drive to provide processors that are adapted for performing operations with floating point numbers having fewer bits (e.g. 8 bits) than those available in the IEEE single precision and half-precision formats. Although there is a likely reduction in the range and precision provided by such formats, there is the advantage that each individual floating-point number requires reduced storage space in memory and in the processor registers. Additionally, due to the reduced number of mantissa and exponent bits that must be handled, each such number is less demanding in terms of the circuitry required to process the number. Since the logic required to process each FP value is less demanding, it is possible to provide more instances of that logic and therefore increase the performance of the processor as measured by floating-point operations per cycle (i.e. it is possible to operate on more items of data in parallel—i.e. operate on vectors of the same size (in terms of bits), but which contain more data items).

Table 2 summarises how the floating-point numbers are interpreted for different ranges of the exponent and the mantissa according to a proposed standard for FP8 numbers.

TABLE 2

| Sign | Exponent | Mantissa | Interpretation |
| --- | --- | --- | --- |
| 0,1 | $01_H, \ldots, FF_H$ | $00_H, \ldots, FF_H$ | Normal numbers |
| 0,1 | $00_H$ | $01_H, \ldots, FF_H$ | Denorms |
| 0 | $00_H$ | $00_H$ | Unsigned Zero |
| 1 | $00_H$ | $00_H$ | Nan |

SUMMARY

The range of floating-point numbers representable by a particular string of bits may decrease with the number of bits used to represent each floating-point number. According to the IEEE 754 standard, the largest value representable in the single-precision (i.e. 32-bit) floating point format is approximately $3.403 \times 10^{38}$, whereas the smallest positive normal number representable is approximately $1.175 \times 10^{-38}$. Similarly, in the IEEE standard half-precision format, the largest representable value is 65504, whereas the smallest positive normal number is approximately $6.10 \times 10^{-5}$. If arithmetic operations using floating point values that produce results having magnitudes that are larger than the maximum value for the relevant format (e.g. $3.403 \times 10^{38}$ for single-precision or 65504 for half-precision) are performed, an overflow condition occurs. On the other hand, if a processing device performs arithmetic operations using floating point values that produce results having magnitudes that are smaller than the minimum positive normal value for the relevant format (e.g. $1.175 \times 10^{-38}$ for single-precision or $6.10 \times 10^{-5}$ for half-precision), an underflow condition occurs.

It would be appreciated that, when using floating-point numbers represented by fewer than 16 bits, the range of representable values tends to decrease further, such that overflow and underflow conditions may become increasingly likely.

Certain arithmetic operations involve the use of a set of input values to generate a result value. The arithmetic operations are performed by arithmetic processing circuitry, which receives the set of input values and outputs the result value. One problem may arise in which the distribution of input values required for providing to the arithmetic processing circuitry does not align well with the representable distribution of values for the FP format in which those values are stored in memory. For example, a software process may be configured to cause a set of values having large magnitudes to be provided to arithmetic processing circuitry for processing. For performance and memory saving reasons, it may be desirable to represent the FP values in a lower precision, lower range format, e.g. an 8-bit format. Given the reduced range of such a format, it may not be possible to represent many of the required large input values in the format. A similar issue also arises in the case that the required distribution of values includes a significant number of values having magnitudes that are smaller than those representable in the lower precision format. One proposed solution is to convert the lower precision FP values to a higher precision format, and then apply the scaling to those values in accordance with the effective bias values required for the FP values, prior to them being processed by arithmetic processing circuitry. The higher precision format prevents the occurrence of overflow or underflow that may occur if the scaling were applied to the values when represented in the lower precision format. However, the conversion to the higher precision format may eliminate the performance improvements associated with the use of a lower precision format, such as FP8, by reducing the number of floating-point operations per second (FLOPs) achievable with a given amount of arithmetic processing circuitry.

According to a first aspect, there is provided a processing device comprising: a control register configured to store a scaling factor; and at least one execution unit configured to execute instructions to perform arithmetic operations on input floating-point numbers provided according to a first floating-point format, wherein each of the input floating-point numbers provided according to the first floating-point format comprises a predetermined number of bits, wherein the at least one execution unit comprises arithmetic processing circuitry configured to perform the arithmetic operations on the input floating-point numbers, wherein the at least one execution unit is configured to, in response to execution of an instance of a first of the instructions: perform processing by the arithmetic processing circuitry of a first set of the input floating-point numbers to generate a result value, the result value provided in a further format and comprising more the predetermined number of bits, wherein the further format enables representation of a greater range of values than is representable in the first floating-point format; and apply the scaling factor specified in the control register to increase or decrease an exponent of the result value.

The inventors have realised that the scaling of the input values may be effectively achieved by applying appropriate scaling to a result value of the arithmetic processing in the case that the result value comprises more exponent bits than each of the input values (and hence provides for a greater range of representable value). Since the result value is provided in a format having a greater range than the first floating-point format in which the input values are provided, the scaling, even if it would result in overflow or underflow when applied to the input values provided in the first floating-point format, will not result in overflow or underflow of the result value. When an appropriate scaling factor is applied to increase or decrease the exponent of the result value, the scaled result value is the same value that would result from applying scaling to the exponents of the input values, prior to arithmetic processing of the input values, based on effective bias values associated with those input values.

According to a second aspect, there is provided a method comprising storing a scaling factor; executing instructions to perform arithmetic operations on input floating-point numbers provided according to a first floating-point format, wherein each of the input floating-point numbers provided according to the first floating-point format comprises a predetermined number of bits; and in response to execution of an instance of a first of the instructions: performing processing of a first set of the input floating-point numbers to generate a result value, the result value provided in a further format and comprising more the predetermined number of bits, enabling representation of a greater range of values than is representable in the first floating-point format; and applying the scaling factor specified in the control register to increase or decrease an exponent of the result value.

According to a third aspect, there is provided a non-transitory computer readable medium storing a computer program comprising a set of instructions, which when executed by at least one execution unit of a processing device, causes a method to be performed, the method comprising: storing a scaling factor; performing arithmetic operations on input floating-point numbers provided according to a first floating-point format, wherein each of the input floating-point numbers provided according to the first floating-point format comprises a predetermined number of bits; and in response to execution of an instance of a first of the instructions: performing processing of a first set of the input floating-point numbers to generate a result value, the result value provided in a further format and comprising more the predetermined number of bits, enabling representation of a greater range of values than is representable in the first floating-point format; and applying the scaling factor specified in the control register to increase or decrease an exponent of the result value.

BRIEF DESCRIPTION OF DRAWINGS

For a better understanding of the present invention and to show how the same may be carried into effect, reference will now be made by way of example to the accompanying Figures in which.

DETAILED DESCRIPTION

Embodiments are implemented in a processing device, which may take the form of a processor 4, and which is described in more detail with reference to FIG. 1. In some embodiments, the processor 4 may take the form of a tile of a multi-tile processing unit. An example of such a multi-tile processing unit is described in more detail in our earlier application U.S. application Ser. No. 16/527,410, which is incorporated by reference.

Figure 1:
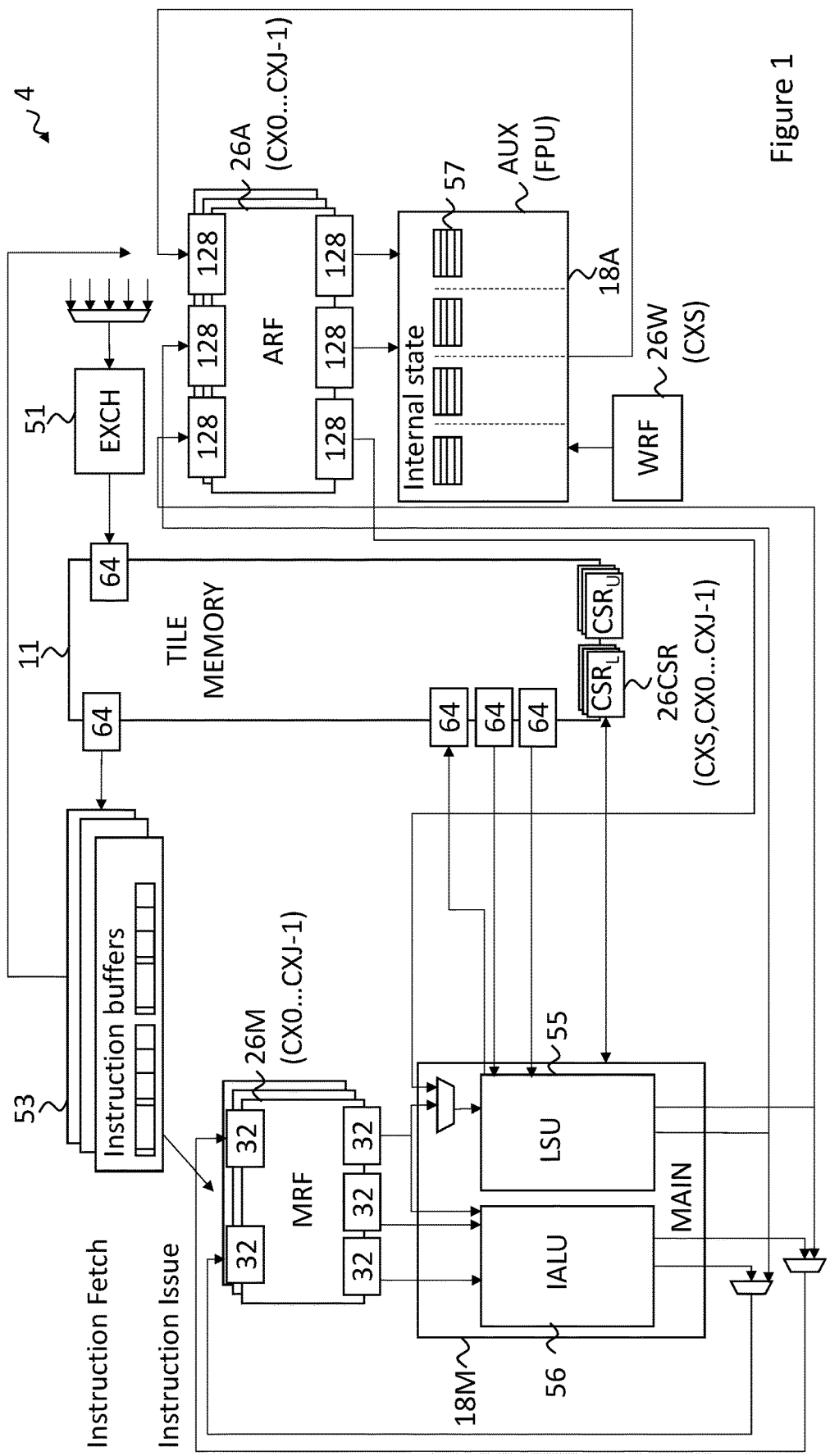
FIG. 1 illustrates a processing device in which embodiments are implemented.

Reference is made to FIG. 1 illustrates an example of the processor 4 including detail of the execution units 18A, 18M and context registers. The processor 4 shown includes a weights register file 26W, and so may be specially adapted for machine learning applications, in which machine learning models are trained by adjusting the weights for those models. However, embodiments of the application are not limited to machine learning applications but are more broadly applicable.

The processor 4 described is a multi-threaded processor capable of executing M threads concurrently. The processor 4 is able to support execution of M worker threads and one supervisor thread, where the worker threads perform arithmetic operations on data to generate results and the supervisor thread co-ordinates the worker threads and control the synchronisation, sending and receiving functionality of the processor 4.

The processor 4 comprises a respective instruction buffer 53 for each of M threads capable of being executed concurrently. The context registers comprise a respective main register file (MRF) 26M for each of M worker contexts and a supervisor context. The context registers further comprise a respective auxiliary register file (ARF) 26A for at least each of the worker contexts. The context registers further comprise a common weights register file (WRF) 26W, which all the currently executing worker threads can access to read from. The WRF may be associated with the supervisor context in that the supervisor thread is the only thread that can write to the WRF. The context registers may also comprise a respective group of control state registers 26CSR for each of the supervisor and worker contexts. The execution units comprises a main execution unit 18M and an auxiliary execution unit 18A. The main execution unit 18M comprises a load-store unit (LSU) 55 and an integer arithmetic logic unit (IALU) 56. The auxiliary execution unit 18A comprises at least a floating-point arithmetic unit (FPU).

In each of the J interleaved time slots S0 . . . SJ-1, the scheduler controls the fetch stage to fetch at least one instruction of a respective thread from the instruction memory 11, into the respective one of the J instruction buffers 53 corresponding to the current time slot. In embodiments, each time slot is one execution cycle of the processor, though other schemes are not excluded (e.g. weighted round-robin). In each execution cycle of the processor 4 (i.e. each cycle of the processor clock which clocks the program counter) the fetch stage fetches either a single instruction or a small "instruction bundle" (e.g. a two-instruction bundle or four-instruction bundle), depending on implementation. Each instruction is then issued, via the decode stage, into one of the LSU 55 or IALU 56 of the main execution unit 18M or the FPU of the auxiliary execution unit 18A, depending on whether the instruction (according to its opcode) is a memory access instruction, an integer arithmetic instruction or a floating-point arithmetic instruction, respectively. The LSU 55 and IALU 56 of the main execution unit 18M execute their instructions using registers from the MRF 26M, the particular registers within the MRF 26M being specified by operands of the instructions. The FPU of the auxiliary execution unit 18A performs operations using registers in the ARF 26A and WRF 26W, where the particular registers within the ARF are specified by operands of the instructions. In embodiments, the registers in the WRF may be implicit in the instruction type (i.e. pre-determined for that instruction type). The auxiliary execution unit 18A may also contain circuitry in the form of logical latches internal to the auxiliary execution unit 18A for holding some internal state 57 for use in performing the operations of one or more of the types of floating-point arithmetic instruction.

In embodiments that fetch and execute instructions in bundles, the individual instructions in a given instruction bundle are executed simultaneously, in parallel down independent pipelines 18M, 18A (shown in FIG. 1). In embodiments that execute bundles of two instructions, the two instructions may be executed simultaneously down respective auxiliary and main pipelines. In this case, the main pipeline is arranged to execute types of instruction that use the MRF and the auxiliary pipeline is used to execute types of instruction that use the ARF. The pairing of instructions into suitable complementary bundles may be handled by the compiler.

Each worker thread context has its own instance of the main register file (MRF) 26M and auxiliary register file (ARF) 26A (i.e. one MRF and one ARF for each of the barrel-threaded slots). Functionality described herein in relation to the MRF or ARF is to be understood to operate on a per context basis. However there is a single, shared weights register file (WRF) shared between the threads. Each thread can access the MRF and ARF of only its own context. However, all currently-running worker threads can access the common WRF. The WRF thus provides a common set of weights for use by all worker threads. In embodiments only the supervisor can write to the WRF, and the workers can only read from the WRF.

The instruction set of the processor 4 includes at least one type of load instruction whose opcode, when executed, causes the LSU 55 to load data from the data memory into the respective ARF 26A of the thread in which the load instruction was executed. The location of the destination within the ARF 26A is specified by an operand of the load instruction. Another operand of the load instruction specifies an address register in the respective MRF 26M, which holds a pointer to an address in the data memory from which to load the data. The instruction set of the processor 4 also includes at least one type of store instruction whose opcode, when executed, causes the LSU 55 to store data to the data memory from the respective ARF of the thread in which the store instruction was executed. The location of the source of the store within the ARF 26A is specified by an operand of the store instruction. Another operand of the store instruction specifies an address register in the MRF, which holds a pointer to an address in the data memory to which to store the data. In general, the instruction set may include separate load and store instruction types, and/or at least one load-store instruction type which combines the load and store operations in a single instruction.

In response to the opcode of the relevant type of arithmetic instruction, the arithmetic unit (e.g. FPU) in the auxiliary execution unit 18A performs an arithmetic operation, as specified by the opcode, which comprises operating upon the values in the specified source register(s) in the threads' respective ARF and, optionally, the source register (s) in the WRF. It also outputs a result of the arithmetic operation to a destination register in the thread's respective ARF as specified explicitly by a destination operand of the arithmetic instruction.

It will be appreciated that the labels "main" and "auxiliary" are not necessarily limiting. In embodiments they may be any first register file (per worker context), second register file (per worker context) and shared third register file (e.g. part of the supervisor context but accessible to all workers). The ARF 26A and auxiliary execution unit may also be referred to as the arithmetic register file and arithmetic execution unit since they are used for arithmetic instructions (or at least for floating-point arithmetic). The MRF 26M and auxiliary execution unit may also be referred to as the memory address register file and arithmetic execution unit since one of their uses is for accessing memory. The weights register file (WRF) 26W is so-called, because it is used to hold multiplicative weights used in a certain type or types of arithmetic instruction, to be discussed in more detail shortly. E.g. these could be used to represent the weights of nodes in a neural network. Seen another way, the MRF could be called the integer register file as it is used to hold integer operands, whilst the ARF could be called the floating-point register file as it is used to hold floating-point operands. In embodiments that execute instructions in bundles of two, the MRF is the register file used by the main pipeline and the ARF is the register used by the auxiliary pipeline.

In alternative embodiments, however, note that the register space is not necessarily divided into these separate register files for these different purposes. Instead instructions executed through the main and auxiliary execution units may be able to specify registers from amongst the same shared register file (one register file per context in the case of a multithreaded processor). Also the pipeline does not necessarily have to comprise parallel constituent pipelines (e.g. aux and main pipelines) for simultaneously executing bundles of instructions.

The processor 4 may also comprise an exchange interface 51 for exchanging data between the memory 11 and one or more other resources, e.g. other instances of the processor and/or external devices such as a network interface or network attached storage (NAS) device. As discussed above, in embodiments the processor 4 may form one of an array of interconnected processor tiles, each tile running part of a wider program. The individual processors 4 (tiles) thus form part of a wider processor or processing system. The tiles 4 may be connected together via an interconnect subsystem, to which they connect via their respective exchange interface 51. The tiles 4 may be implemented on the same chip (i.e. die) or on different chips, or a combination (i.e. the array may be formed from multiple chips each comprising multiple tiles 4). The interconnect system and exchange interface 51 may therefore comprise an internal (on-chip) interconnect mechanism and/or external (inter-chip) exchange mechanism, accordingly.

Figure 2:
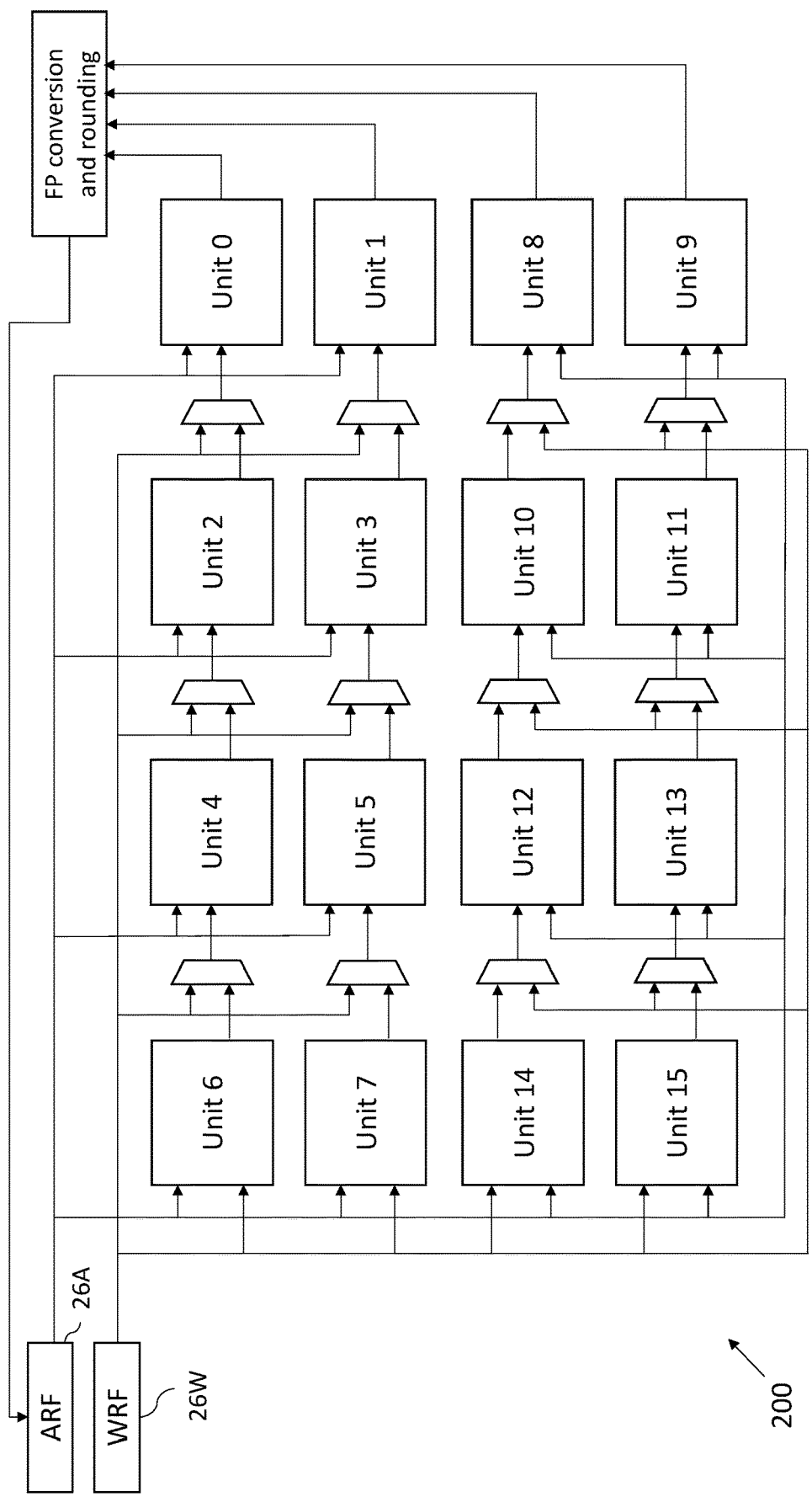
FIG. 2 illustrates circuitry of a hardware module of an execution unit of the processing device.

The processing unit 18A comprises a hardware module for performing a plurality of arithmetic operations in parallel on different elements of a vector that is supplied as an input to the hardware module. Reference is made to FIG. 2, which illustrates an example of the hardware module 200 that is part of the execution unit 18A.

The hardware module 200 comprises a plurality of units (referred to as AMP units), which are labelled Unit 0 to Unit 15 in FIG. 2. Each of the AMP units comprises processing circuitry for performing arithmetic operations—in particular multiplications and additions —on input values supplied to that AMP unit. Each of the AMP units also comprises a pair of accumulators for storing state information associated with the operations performed by the respective processing circuitry.

Control circuitry is also provided as part of the hardware module 200 for controlling the flow of data to and from the different AMP units of the hardware module 200.

When certain instructions are executed, input values are supplied to each of the AMP units. For a particular AMP unit, each of the input values are supplied to arithmetic processing circuitry of that AMP unit, which processes the input values to provide a result value. This result of the arithmetic processing may be referred to as an intermediate value, since it is used to update the state held in an accumulator of the AMP unit. Prior to using the intermediate value to update the state, the exponent of the intermediate value is scaled (i.e. increased or decreased) in accordance with a scaling factor held in a CSR of the processing device 4. The scaling factor held in the CSR is applied to all of the intermediate values, prior to their use for updating the accumulator state.

Figure 3:
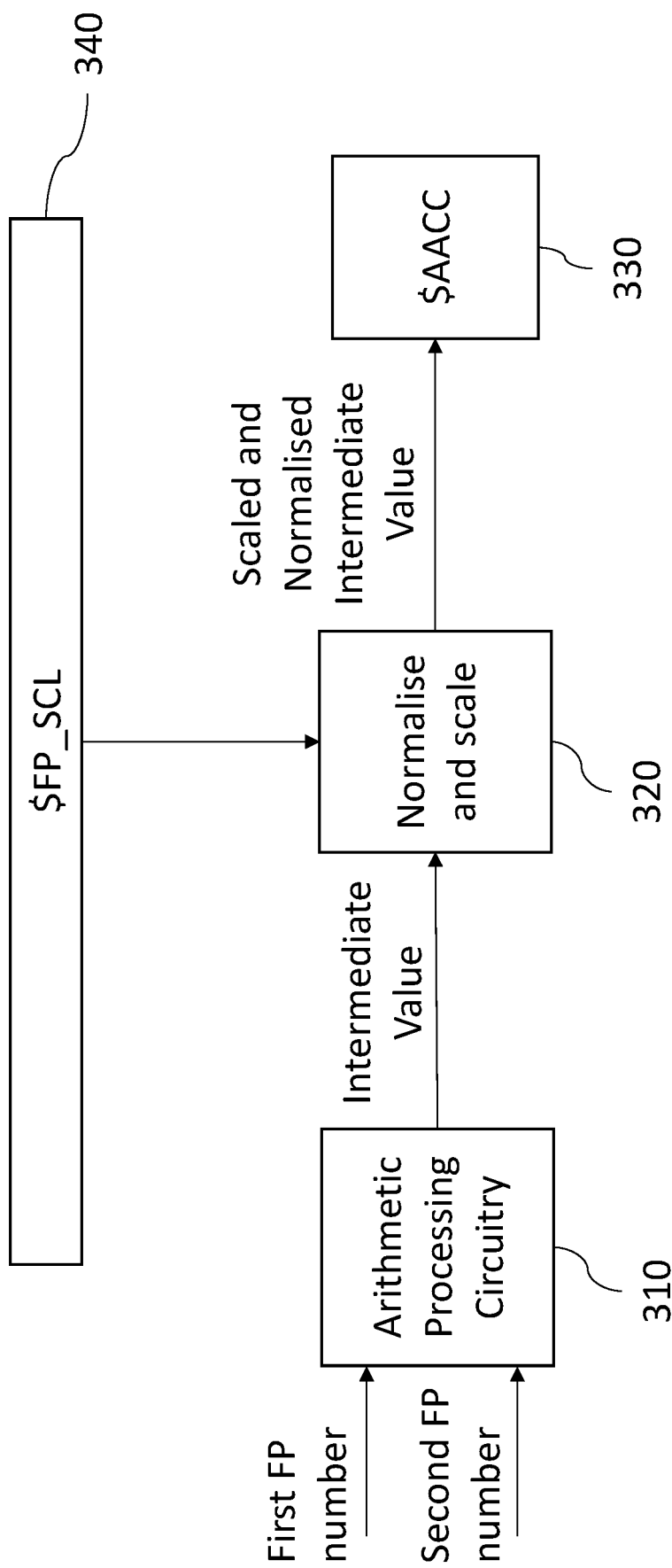
FIG. 3 is a schematic providing an overview of circuitry for performing processing for an instruction, where that processing comprises scaling an intermediate value.

Reference is made to FIG. 3, which illustrates certain example circuitry for generating and scaling an intermediate value, which is then applied to update the state of the accumulator 330. The arithmetic processing circuitry 310, normalisation and scaling circuitry 320 and the accumulator 330 are each provided in an AMP unit. Each of the AMP units 0 to 15 shown in FIG. 2 comprises a separate instance of these circuits 310, 320, 330. It is noted that, although FIG. 3 shows only a single value being used to update the accumulator 330, the state held in the accumulator 330 would be updated multiple times in dependence upon multiple similarly generated intermediate values.

In response to the execution of certain instructions, the processing circuitry 310 receives a plurality of floating-point numbers, including at least a first FP number and a second FP number as shown. Each of these FPs are provided according to a first FP format, which may be a format in which each of the FP numbers is represented by a string of 8 bits. Each of these 8-bit strings may be interpreted in accordance with table 2 above.

Each of the first FP number and the second FP number has an associated bias (hereafter the 'effective bias'), which may differ from the default bias for the FP format in which the numbers are provided. The effective bias for a particular FP value dictates how that value will be interpreted and processed in response to instructions executed by the execution unit 18A.

For some instructions executed by the execution unit 18A, the effective bias values may be applied up front to scale the exponent values of the input FP values. For the instructions with which the present application is concerned, a scaling factor is instead applied to increase or decrease an exponent of a result of processing the input FP values, where that scaling factor depends upon the effective bias values of the input value. As will be described, the effective bias values are used by instructions executed by an execution unit 18A, 18M of the processing device 4 to determine the scaling factor to be applied to the result from the arithmetic processing of the two FP numbers.

The output of the arithmetic processing circuitry 310 is the result of the arithmetic processing of the input FP numbers. The result value is an intermediate value and is represented by a larger number of bits than the number of bits (e.g. 8 bits) used for the first FP format. The result value comprises a greater number of exponent bits than is available in the first FP format, providing a greater range for representing different possible intermediate values, and hence enabling overflow or underflow to be avoided when performing the scaling.

The accumulator 330 is provided to maintain state that is updated in response to the execution of each of multiple instructions. This enables efficient performance of calculations over a larger number of input values that may be supplied as operands of a single type of instruction. In order to enable representation of a larger range of values, the accumulator 330 stores state according to a second floating-point format for which each of the FP numbers in the second FP format comprises more bits than the FP numbers provided according to the first FP format. The second FP format may be the single-precision FP format, for which each of the FP numbers comprises 32 bits. The FP32 values, which at different times represent the state held in the accumulator 330 are provided with the default bias for single-precision values. In particular, each FP32 value held in the accumulator 330 has a bias of 127.

In order to use the intermediate value to update the state information held in the accumulator 330, the intermediate value is first converted by the circuitry 320 to the second FP format so as to be compatible with the accumulator 330 and its current state. The normalisation circuitry 320 also applies the scaling factor held in the control register 340, which is one of the CSRs of the worker thread that executed the instruction. The normalisation circuitry 320 applies the scaling factor to the exponent value of the intermediate value, so as to scale that exponent value up or down by the amount specified in the register 340.

The scaling control value is stored in the register 340 in response to the execution of another instruction by the execution unit 18M of the device 4. This value is determined based on the effective bias values of the FP8 input values that are provided to the Arithmetic Processing circuitry 310. In particular, an execution unit 18A, 18M determines the scaling factor by adding together a component based on the effective bias of the first FP8 number and the effective bias of the second FP number. For example, suppose that the first FP8 number has an effective bias that is x greater than the default bias for the first-floating point format, whilst the second FP8 number has an effective bias that is y greater than the default bias for the first-floating point format. In this case, the scaling factor is determined as:

$$\text{Scaling factor} = -(x+y) \quad \text{Equation 1}$$

The effect of applying equation 1 is that the scaling factor is set to a value, such that the scaled result value output by the normalisation and scaling circuitry 320 matches the result value that would be output by the arithmetic processing circuitry 310 were the exponents of the input values to be scaled in accordance with their effective biases prior to being provided as inputs to the arithmetic processing circuitry 310.

The values of x and y may be retrieved from memory 11 by an execution unit 18A, 18M and used by that execution unit 18A, 18M to determine the scaling factor in accordance with equation 1. The execution unit 18M executes an instruction to store the scaling factor into the register 340 for use when subsequent instructions are executed by execution unit 18A to cause certain arithmetic processing to be performed using the AMP unit circuitry.

The scaling control value is provided as a signed integer value, and is added to the exponent of the result value output by the circuitry 310 so as to scale that result value up or down.

The effective bias values of the input FP8 numbers may themselves be set based on statistics collected over a set of values that provide an indication of the likelihood of overflow or underflow and hence the amount of scaling required in order to prevent such overflow or underflow when calculations are performed that take the FP8 numbers as inputs. The effective bias values associated with different sets of FP8 values are stored in memory 11 and may be accessed by the execution unit 18A, 18M to enable that execution unit 18A, 18M to determine, in accordance with equation 1, the scaling factor to be stored in the register 340.

After a plurality of instances of the same instruction have been executed by the execution unit 18A, multiple ones of the intermediate values have been generated and the state information held in the accumulator 330 has been updated in dependence upon each such intermediate value. The execution unit 18A then causes the state information held in the accumulator 330 to be read out and stored in an ARF 26A of the device 4. The state read out from the accumulator 330 may converted to the half-precision format by circuitry of the device 4, before being stored in the ARF 26A.

One type of instruction that may be executed by the execution unit 18A, and for which scaling of intermediate values generated during execution of the instruction is performed, is an accumulating matrix-product instruction. The hardware module 200 is operable to evaluate different versions of this instruction for different floating-point number formats. For example, the execution unit 18A supports execution of a FP32 version of the instruction (referred to as f32sisov2amp), a FP16 version of the instruction (referred to as f16v4hihov4amp), and an FP8 version of the instruction (referred to as a f8v8hihov4amp). For each of these instruction types, the AMP units of hardware module 200 implement the arithmetic processing, and perform the accumulation of results of that arithmetic processing. For at least the FP8 version of the instruction (which takes a vector of 8-bit FP values as an input), scaling is performed to the result of the arithmetic processing (i.e. the intermediate value), prior to the use of that result to update the accumulator state.

The f8v8hihov4amp instruction takes as an operand, a vector of 8-bit FP numbers. This vector is supplied to the hardware module 200 from the ARF 26A along with a matrix of values from the weight register file 26W. The hardware module 200 computes the dot product of the input vector with different vectors from the matrix, and uses the resulting dot product values to update accumulators of the AMP unit.

Such accumulators may be updated multiple times in response to the execution of multiple instances of the f8v8hihov4amp instruction.

The f8v8hihov4amp instruction finds applications in machine learning, where it may be used to determine the activations for a layer of a neural network, given knowledge of the activations for a preceding layer of the network, and given the weights for the connections between those two layers. In this case, the input vector of FP8 values provides a subset of the activation values for the preceding layer. Each AMP unit evaluates the dot product between these activation values and part of the weight matrix so as to determine the contribution from those activation values to a single activation value for the next layer. Each AMP unit updates its accumulator state with this determined contribution. When the next instance of the f8v8hihov4amp instruction is executed, a different subset of the activation values for the preceding layer are provided as the input, and each AMP unit determines the contribution of that subset of activation values to its single activation value for the next layer. Over the execution of multiple instructions, the contribution of different sets of activations to a set of activations in the next layer is determined.

Figure 4:
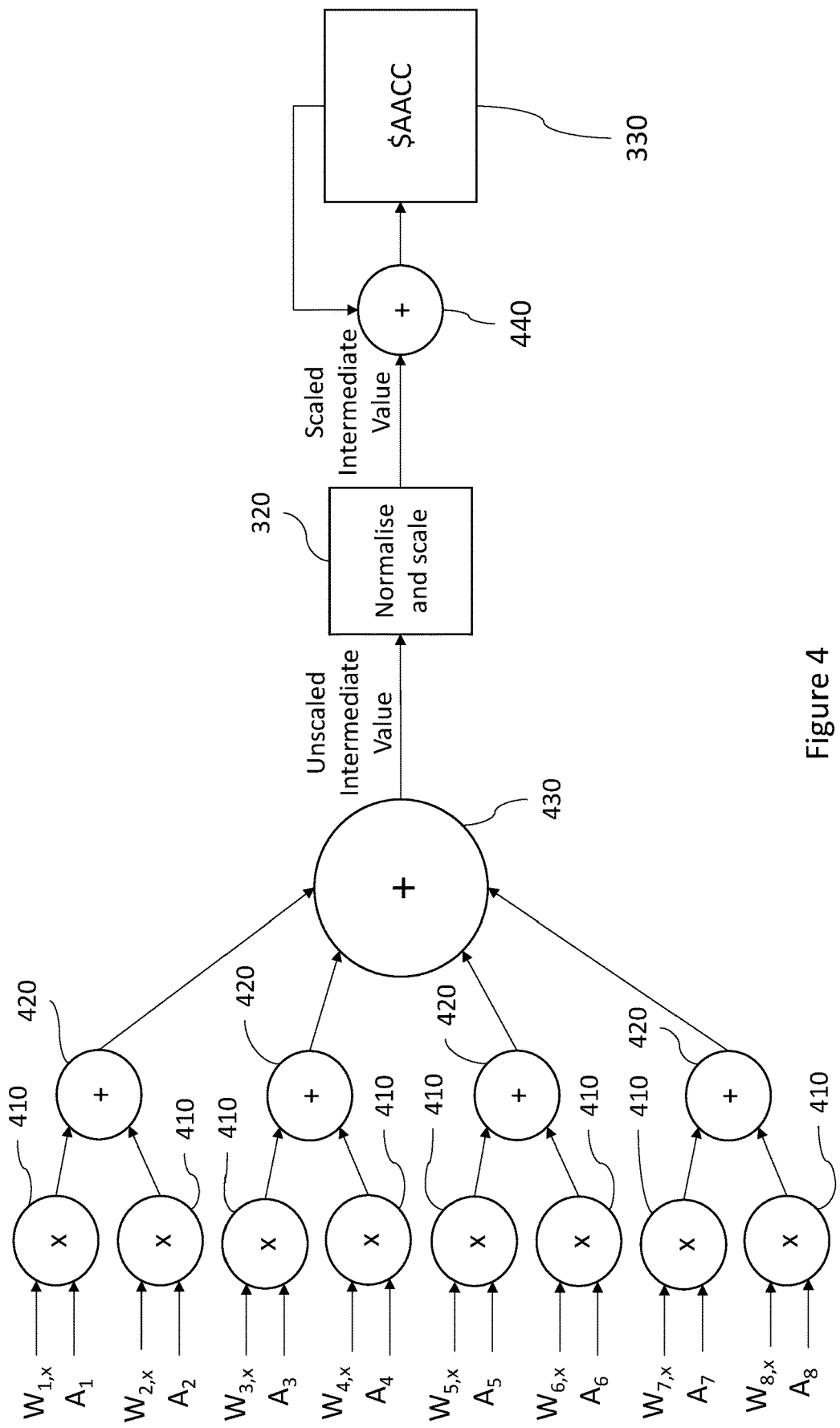
FIG. 4 illustrates the circuitry for updating state of accumulator, showing the arithmetic processing circuitry for processing inputs to generate an intermediate value used to update the state.

Reference is made to FIG. 4, which illustrates the arithmetic processing circuitry for evaluating the dot product and using the result of this evaluation to update the state of an accumulator 330. FIG. 4 shows the circuitry within a single one of the AMP units. However, it would be appreciated that the other AMP units have the same circuitry and operate in the same manner.

As shown, the arithmetic processing circuitry comprises a plurality of multipliers 410, a first set of addition circuitry 420, and further addition circuitry 430. The input values, which are supplied as an operand of the f8v8hihov4amp instruction, and which are supplied to each AMP unit from the ARF 26A, are shown as a vector of values: $[A_1, A_2, A_3, A_4, A_5, A_6, A_7, A_8]$. The vector of the weight matrix that is supplied from the WRF 26W to the respective AMP unit when the instruction is executed is shown as $[W_{1,x}, W_{2,x}, W_{3,x}, W_{4,x}, W_{5,x}, W_{6,x}, W_{7,x}, W_{8,x}]$. Each of the input vector values $A_1$-$A_8$ and the input weight values $W_{1,x}$-$W_{8,x}$ is represented by an FP8 value. These values are loaded from memory 11 into their respective registers 26A and 26W and then supplied to the respective multipliers 410. Each of the input weights values $W_{1,x}$-$W_{8,x}$ have the same effective bias, whereas each of the input vector values $A_1$-$A_8$ have the same effective bias (which may be different to the effective bias for the weights). It may be required to effectively shift the distribution of the input values to provide a set of suitable input values for the calculations performed by the AMP unit.

However, if the scaling is performed prior to the multiplication of these values, i.e. when they are in the FP-8 format, there is a risk of overflow or underflow conditions occurring. Therefore, the scaling is performed to the value that results from the final adder 430. As a result of the arithmetic processing performed by the circuitry 410, 420, 430, this value has a wider exponent field than is available in the FP8 format of the input values, enabling a greater range of values to be represented. The result of the arithmetic processing is a transient value that is provided in a non-standard floating-point format. The non-standard floating-point format comprises a greater number of exponent bits than is available in either of the FP8 formats described herein, and a greater number of mantissa bits (36 in some embodiments).

In the case that the are two sets of values (i.e. $A_1$-$A_8$ and $W_{1,x}$-$W_{8,x}$) to be provided to the multipliers 410, the execution unit 18A, 18M determines the scaling factor in the same way by applying equation 1, where in this case 'x' is the effective bias value for the first vector of values (i.e. $A_1$-$A_8$), whilst 'y' is the effective bias value for the second vector of values ($W_{1,x}$-$W_{8,x}$).

Figure 5:
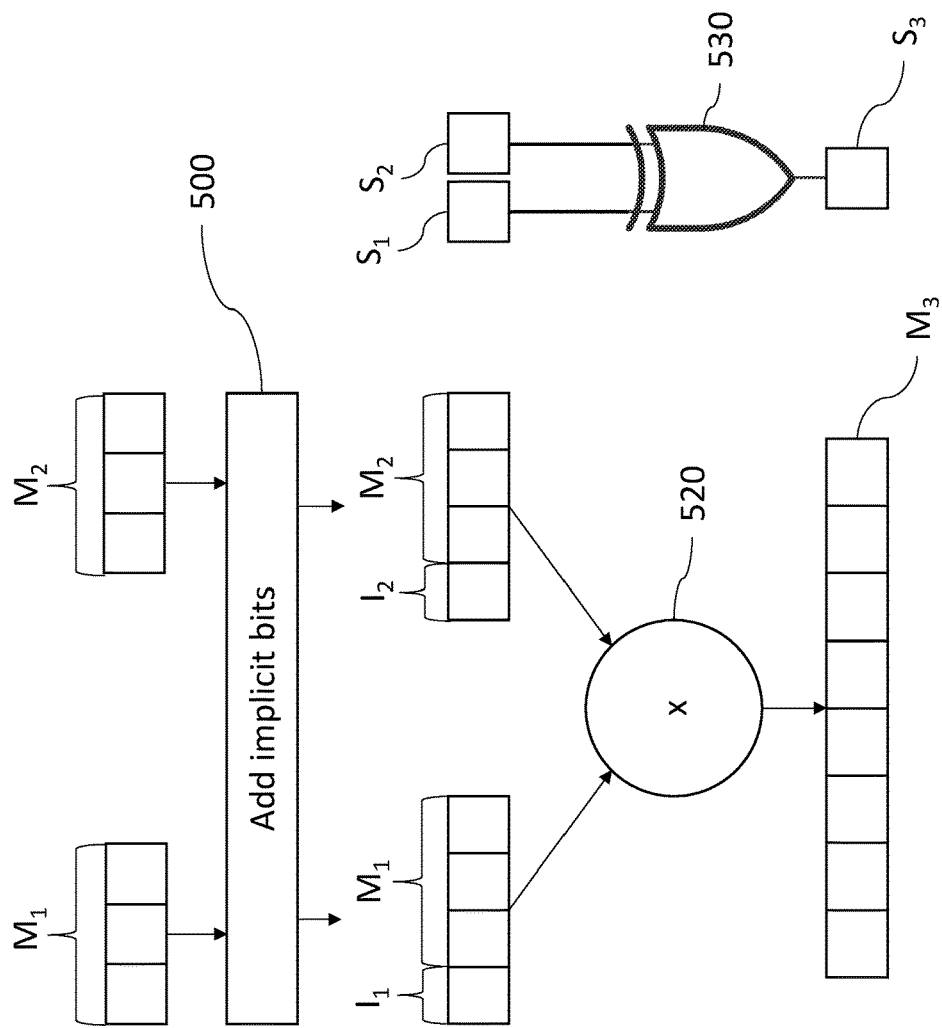
FIG. 5 is a schematic illustration of the FP multiplier.

Reference is made to FIG. 5, which illustrates how a multiplication operation by the multipliers 410 may be performed. A first of the FP numbers input to the multiplier 410 has an exponent, labelled as $E_1$, mantissa bits labelled as $M_1$, and a sign bit labelled as $S_1$. Similarly, a second of the FP numbers input to the multiplier 410 has an Exponent labelled as $E_2$, a mantissa, labelled as $M_2$, and a sign bit labelled as $S_2$. In addition to the mantissa bits provided as part of the 8-bits for the number, the implicit bits $I_1$ and $I_2$ of the mantissa are also shown. These implicit bits are added by circuitry 500 of the multiplier, which adds the implicit bits in dependence upon the values of the exponents (i.e. $E_1$ and $E_2$), which indicate whether the respective FP number is a norm or denorm.

The FP multiplier 410 comprises an adder 510 for adding together the two exponents, $E_1$ and $E_2$, to generate a resulting exponent, $E_3$. The FP multiplier 410 comprises a multiplier 520 for multiplying together the mantissas to generate the resulting mantissa $M_3$. The FP multiplier 410 also comprises a XOR gate 530 for determining a value of the sign bit, $S_3$, based upon the values of the input sign bits, $S_1$ and $S_2$.

Figure 6:
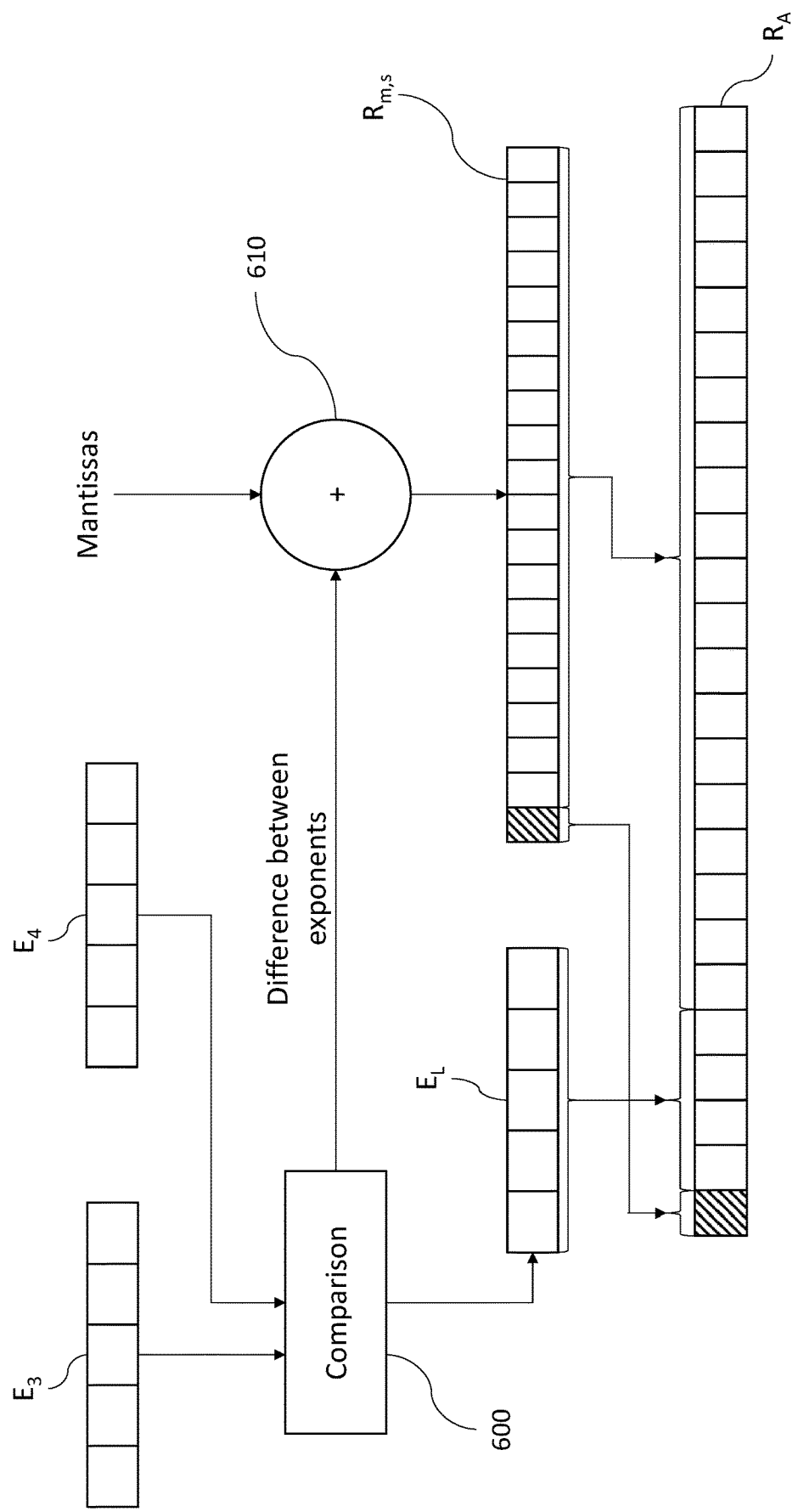
FIG. 6 is a schematic illustration of the FP adder.

Reference is made to FIG. 6, which illustrates circuitry belonging to the FP adders 420 for performing the addition of two outputs of different FP multipliers 410. The FP adder 420 comprises a comparison circuitry 600 for performing a comparison between the two exponents, $E_3$ and $E_4$, that are outputs of multipliers 410 and inputs to the FP adder 420. The comparison circuitry 600 outputs the largest of the exponents, shown as $E_L$, which forms the exponent of the result of the addition by the FP adder 420. The comparison circuitry 600 also outputs the difference between these exponents, which is used by addition circuitry 610 to add together the mantissas of the inputs to the FP adder 420.

Figure 7:
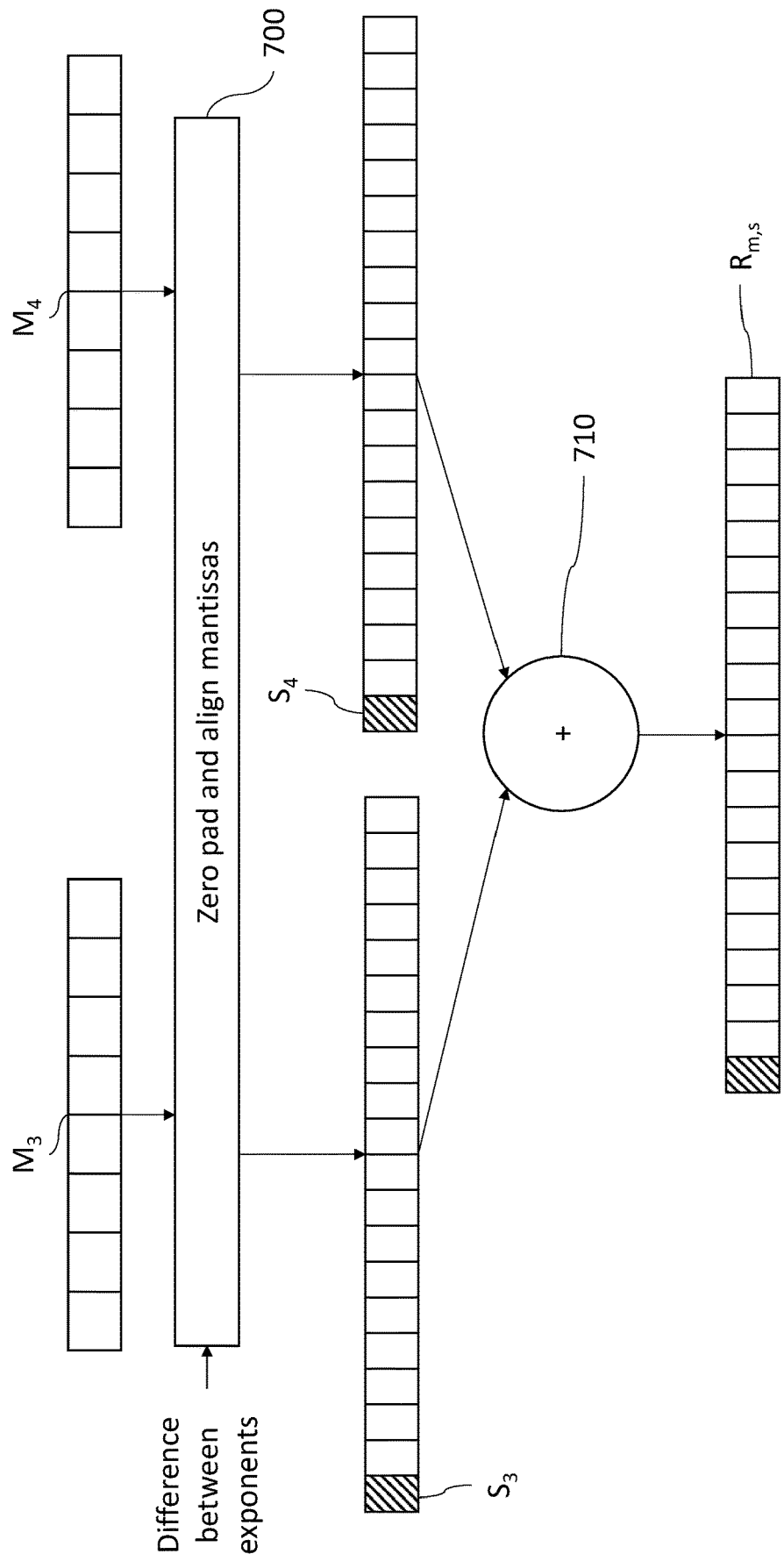
FIG. 7 is a schematic illustration of part of the FP adder.

Reference is made to FIG. 7, which illustrates how the addition between the mantissas is performed by the addition circuitry 610. The addition circuitry 610 comprises circuitry 700 for zero padding the two input mantissas, shown as $M_3$ and $M_4$. The circuitry 700 zero pads both mantissas $M_3$ and $M_4$ and then performs a right shift on one of the zero padded mantissas $M_3$ and $M_4$. The one of the mantissas $M_3$ and $M_4$ that is right shifted is the one associated with (i.e. belonging to the same input value) the smaller of the two exponents $E_3$ and $E_4$. The circuitry 700 performs the right shift to this mantissa having the smaller exponent in dependence upon the difference between the two exponents $E_3$ and $E_4$, which is supplied by comparison circuitry 600. By performing this right shift, the mantissas $M_3$ and $M_4$ are aligned for addition. The addition circuitry 610 comprises adder 710. The sign bits, shown as $S_3$ and $S_4$ are provided, along with the aligned mantissas, to the adder 710. The adder 710 performs the addition between each of the aligned mantissas and sign bits to produce the resulting mantissa and sign bit from the addition, which is shown as $R_{m,s}$.

Referring back to FIG. 6, circuitry of the FP adder 420 combines $R_{m,s}$ with $E_L$ to provide the result of the addition, $R_4$. Each of these addition results output by one of the FP adders 420 is provided to the FP adder 430. The FP adder 430 is configured to perform an addition between four different inputs, each of which is one of the outputs of the FP adders 420. The FP adder 430 performs the addition between these four inputs in an analogous manner to the addition performed by each FP adder 420 between the two inputs it receives. The FP adder 430 determines the largest exponent of the four inputs it receives and outputs this as the exponent of the result. The FP adder 430 aligns the four mantissas by right shifting each one by an amount dependent upon the difference between its corresponding exponent and the largest of the four exponents. The FP adder 430 then adds together the aligned mantissas to provide the mantissa of its output.

The output of FP adder 430, which may be referred to as the unscaled intermediate value, is provided to the circuitry 320, which converts that output to FP32. In embodiments, the unscaled intermediate value comprises a 36 bit mantissa, such that the conversion to the FP32 format (in which values have 23 bit mantissas) is performed by truncating this mantissa and rounding the LSB.

As part of the conversion to FP32, the circuitry 320 applies the scaling factor in register 340 to perform scaling of the exponent. The scaling perform by circuitry 320 to the unscaling intermediate value that it receives as an input may be expressed as:

$$\text{Output exponent} = \text{Input exponent} - (2 \ast \text{default FP8 bias}) + \text{FP32 bias} + \text{scaling factor} \quad \text{Equation 2}$$

The FP32 bias has a value of 127 for all input values and all values of the scaling factor. The output exponent produced here is the exponent of the scaled and normalised intermediate value that is output by circuitry 320. The default FP8 bias will depend upon the particular FP8 format that is used for the input FP8 values. In some embodiments, a first FP8 format is used, in which format, each FP value comprises one sign bit, five exponent bits, and two mantissa bits. In this format, the default bias is 16. In some embodiments, a second FP8 format is used, in which format, each FP value comprises one sign bit, four exponent bits, and three mantissa bits. In this case, the default bias is 8.

In some cases, the two sets of floating-point numbers that are provided as inputs to the arithmetic circuitry 310 are provided according to a different formats. For example, the vector $A_1$-$A_8$ may be provided according to the first FP8 format and therefore each value has a $1^{st}$ default bias (i.e. 16), whilst the vector of values $W_{1,x}$-$W_{8,x}$ may be provided according to the second FP8 format and therefore each value has a $2^{nd}$ default bias (i.e. 8). Therefore, more generally the output exponent may be expressed as:

$$\text{Output exponent} = \text{Input exponent} - 1^{st} \text{ default FP8 bias} - 2^{nd} \text{ default FP8 bias} + \text{FP32 bias} + \text{scaling factor} \quad \text{Equation 3}$$

Figure 8:
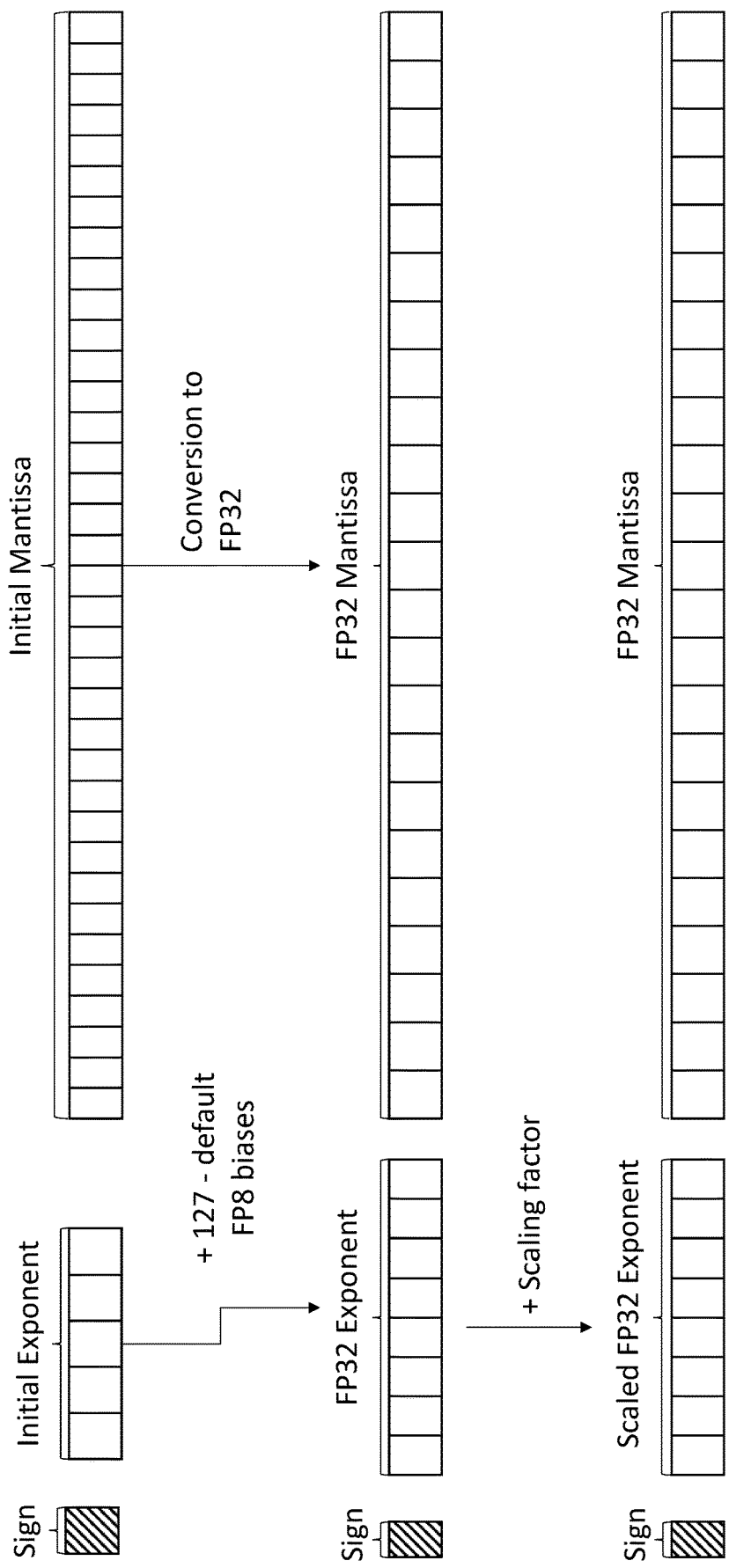
FIG. 8 illustrates the modification to FP values performed by the circuitry.

Reference is made to FIG. 8, which illustrates the operations performed by the circuitry 320. The circuitry 320 receives the output of the FP adder 430, which is represented in the Figure by the components: "Sign", "Initial Exponent", and "Initial Mantissa". The circuitry 320 converts this value to the FP32 format. As part of the conversion, the initial mantissa is truncated and rounded (e.g. using a round to nearest even scheme) to produce the FP32 mantissa. Also, as part of the conversion, the initial exponent is adjusted by adding the default FP32 bias and subtracting the two default FP8 bias values.

This FP32 form of the intermediate value is represented in the Figure by the components: "Sign", "FP32 Exponent", "FP32 Mantissa". The circuitry 320 applies the scaling factor held in the $FP\_SCL register to scale the value of the FP32 exponent to provide the scaled FP32 exponent value. The circuitry 320 performs the scaling by adding the scaling factor to the FP32 exponent to provide the scaled FP32 exponent. The scaled FP32 result is represented by the components: "Sign", "Scaled FP32 Exponent", "FP32 Mantissa".

Although FIG. 8 illustrates the conversion to FP32 being performed prior to the scaling factor being applied, the order of the steps is not important. The order of the operations may be reversed or the steps may be combined and performed together as part of the same operation.

Referring back to FIG. 4, the scaled intermediate value is used to update the state held in the accumulator 330. This state is updated by adding the state currently held in the accumulator 330 to the scaled intermediate value provided as an input to the adder 440. The result of this addition constitutes the updated state, which is written to the accumulator 330.

In response to the execution by the execution unit 18A of multiple instances of the f8v8hihov4amp instruction, multiple instances of the scaled intermediate value are generated and are used to independently update the accumulator state 330. Each instruction takes a different input vector as an operand and so enables the accumulator 330 to accumulate the results from multiple different vector inputs (e.g. representing multiple sets of activations).

The scaling factor may change as required, in dependence upon the required effective bias of the input FP8 values for the arithmetic operations. In order to change the scaling factor, between the execution of two instances of the f8v8hihov4amp instruction, the execution unit 18M executes an instruction to update the scaling factor in register 340 to a new value required for execution of the next instance of the f8v8hihov4amp instruction.

Once the plurality of instances of the f8v8hihov4amp instruction have been executed and used to update the state held in the accumulator 330, circuitry of the execution unit 18A reads out the state into an ARF 26A. After storing the state values to the arithmetic registers 26A, the LSU 55 executes store instructions to store these values to memory 11.

An example has been given in which the arithmetic processing for generating of an intermediate value is performed in response to execution of an accumulating matrix-vector product instruction (the f8v8hihovamp instruction). However, in some embodiments a different type of instructions may be executed to cause arithmetic processing of operands to generate an intermediate value that is scaled. For example, the execution unit 18A is also configured to support execution of a vector slim convolution instruction (f8v8hihov4slic), which uses the same circuitry in the AMP units to compute dot products between a vector supplied as an operand and part of a matrix, and uses the accumulators to accumulate the results.

In the above-described embodiments, the first floating-point format in which values are supplied as operands to an instruction as part of which scaling is performed has been described as being FP8. However, in other embodiments, this format may be a different format, e.g. FP16. Similarly, the floating-point format in which the state held in the accumulators is stored has been described as being FP32. However, in other embodiments, the state may be stored in a different format.

Figure 9A:
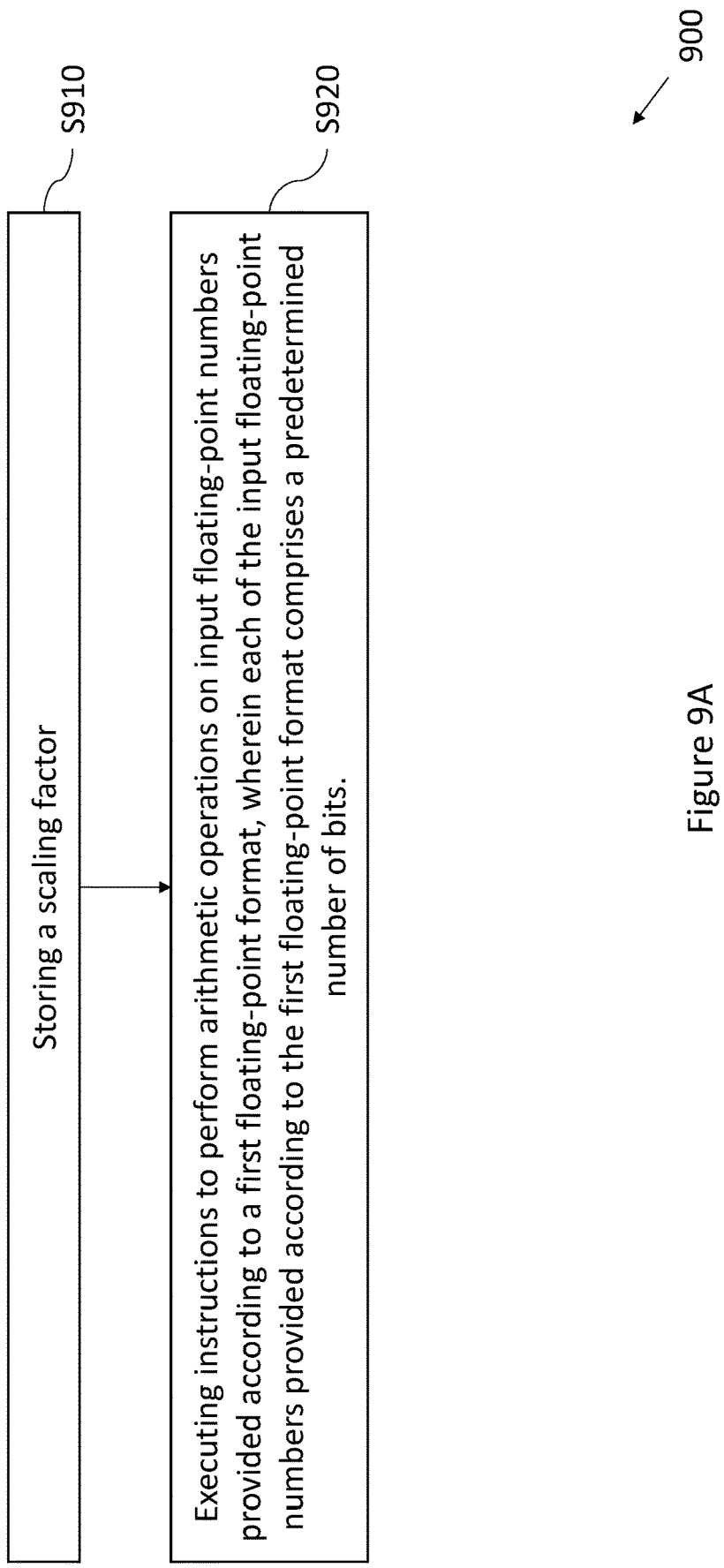
FIG. 9A illustrates a method according to embodiments of the application.

Reference is made to FIG. 9A, which illustrates a method 900 according to embodiments.

At S910, the execution unit 18M causes a value for the scaling factor to be stored in register 340.

At S920, the execution unit 18A executes instructions to perform arithmetic operations on input floating-point numbers provided according to a first floating-point format.

Figure 9B:
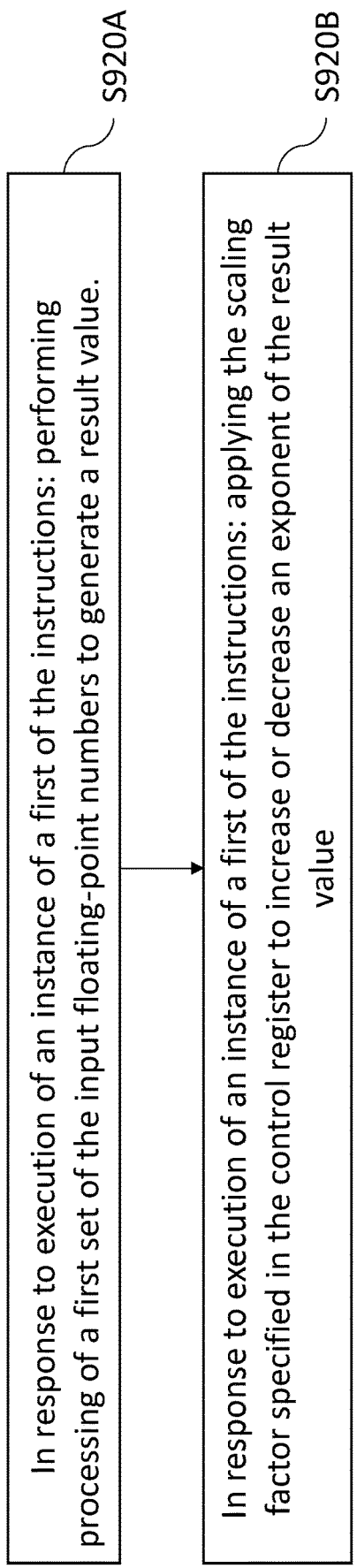
FIG. 9B illustrates steps of part of the method according to embodiments of the application.

Reference is made to FIG. 9B, which illustrates steps (S920A and S920B) performed as part of S920.

At S920A, in response to execution of an instance of a first of the instructions: the arithmetic processing circuitry 310 performs processing of a first set of the input floating-point numbers to generate a result value.

At S920B, in response to execution of an instance of a first of the instructions: the arithmetic processing circuitry 310 applies the scaling factor specified in the control register 340 to increase or decrease an exponent of the result value.

It would be appreciated that embodiments have been described by way of example only.

The invention claimed is:

1. A system comprising:
   at least one execution unit;
   a control register configured to store a scaling factor;
   a memory configured to store floating-point numbers in a first floating-point format, each of the floating-point numbers in the first floating-point format comprising a first quantity of bits;
   one or more additional registers configured to store operands each comprising a set of the floating-point numbers loaded from the memory; and
   a hardware module of the at least one execution unit,
   wherein the at least one execution unit is configured to:
      execute instructions to perform arithmetic operations on the operands, wherein the hardware module comprises arithmetic processing circuitry configured to perform the arithmetic operations,
   wherein the hardware module is configured to, in response to execution of an instance of a first instruction of the instructions:
      perform processing by the arithmetic processing circuitry of a first of the operands comprising a first set of the floating-point numbers to generate a result value, the result value provided in a further floating-point format and comprising more than the first quantity of bits, wherein the further floating-point format enables representation of a greater range of values than is representable in the first floating-point format; and
      apply the scaling factor stored in the control register to increase or decrease an exponent of the result value.

2. The system of claim 1, wherein the processing of the first set of the floating-point numbers comprises performing at least one multiplication using the first set of the floating-point numbers.

3. The system of claim 1, wherein the first floating-point format is an 8-bit floating-point format.

4. The system of claim 1, wherein the at least one execution unit comprises an accumulator configured to store state in accordance with a second floating-point format,
   wherein the at least one execution unit is configured to, in response to the execution of the instance of the first of the instructions:
      convert the result value to the second floating-point format; and
      following the converting the result value to the second floating-point format and the applying the scaling factor specified in the control register to increase or decrease the exponent of the result value, use the result value to update the state stored in the accumulator.

5. The system of claim 4, wherein the second floating-point format is a single precision format.

6. The system of claim 1, wherein the at least one execution unit is configured to generate the result value by, in response to the execution of the instance of the first of the instructions:
   in addition to processing the first set of the floating-point numbers, performing processing by the arithmetic processing circuitry of a second set of the floating-point numbers.

7. The system of claim 6, wherein the arithmetic processing circuitry comprises a plurality of multipliers, wherein the at least one execution unit is configured to generate the result value by, in response to the execution of the instance of the first of the instructions:
   provide as inputs to each of the multipliers, one respective value of the first set of the floating-point numbers and one respective value of the second set of the floating-point numbers.

8. The system of claim 7, wherein the arithmetic processing circuitry comprises addition circuitry configured to perform one or more summations of outputs of the multipliers to generate the result value.

9. The system of claim 6, wherein the second set of the floating-point numbers are provided in a second floating-point format having a first representable range that is less than a second representable range for the further floating-point format in which the result value is provided.

10. The system of claim 1, wherein the at least one execution unit is configured to, prior to the execution of the instance of the first of the instructions, determine the scaling factor in dependence upon bias values associated with the first set of the floating-point numbers and bias values associated with a second set of the floating-point numbers.

11. The system of claim 1, wherein the at least one execution unit is configured to:
   following the execution of the instance of the first of the instructions, execute an instance of a further instruction to store an updated scaling factor in the control register; and
   execute a further instance of the first of the instructions to:
      perform processing by the arithmetic processing circuitry with respect to a further set of the floating-point numbers to generate a further result value; and
      apply the updated scaling factor specified in the control register to increase or decrease an exponent of the further result value.

12. The system of claim 11, wherein at least one floating-point number of the further set of the floating-point numbers has an associated bias that is different to a bias associated with at least one floating-point number of the first set of the floating-point numbers.

13. The system of claim 1, wherein the first set of the floating-point numbers comprises a first set of activation values of a first layer of a neural network,
   wherein the processing by the arithmetic processing circuitry to generate the result value comprises performing a dot product between the first set of activation values and a set of weights, wherein the result value represents a contribution of the first set of activation values to an activation value of a second layer of the neural network.

* * * * *